United States Patent [19]
Laas et al.

[11] Patent Number: 5,731,396
[45] Date of Patent: Mar. 24, 1998

[54] WATER DISPERSIBLE POLYISOCYANATE MIXTURES

[75] Inventors: Hans-Josef Laas, Köln; Martin Brahm, Leverkusen; Reinhard Halpaap, Odenthal, all of Germany

[73] Assignee: Bayer Aktiengesellschaft, Leverkusen, Germany

[21] Appl. No.: 601,479

[22] Filed: Feb. 14, 1996

[30] Foreign Application Priority Data

Feb. 24, 1995 [DE] Germany .................. 19 506 534.4

[51] Int. Cl.$^6$ .................................................. C08G 18/48
[52] U.S. Cl. .................... 528/49; 528/76; 524/839; 252/182.22
[58] Field of Search .................... 252/182.22; 528/49, 528/76; 524/839

[56] References Cited

U.S. PATENT DOCUMENTS

| | | | |
|---|---|---|---|
| 4,433,095 | 2/1984 | Hornbach et al. | 524/563 |
| 4,663,377 | 5/1987 | Hornbach et al. | 524/196 |
| 5,075,370 | 12/1991 | Kubitza et al. | 524/591 |
| 5,200,489 | 4/1993 | Jacobs et al. | 528/49 |
| 5,252,696 | 10/1993 | Laas et al. | 528/49 |
| 5,387,367 | 2/1995 | Haeberle et al. | 252/182.22 |

FOREIGN PATENT DOCUMENTS

| | | |
|---|---|---|
| 1195048 | 10/1985 | Canada . |
| 2088609 | 8/1993 | Canada . |
| 4007637 | 9/1991 | Germany . |
| 1417276 | 12/1975 | United Kingdom . |
| 1417618 | 12/1975 | United Kingdom . |
| 1444933 | 8/1976 | United Kingdom . |
| 2018796 | 10/1979 | United Kingdom . |

*Primary Examiner*—Rachel Gorr
*Attorney, Agent, or Firm*—Joseph C. Gil; Thomas W. Roy

[57] ABSTRACT

Water dispersible polyisocyanate mixtures, which are prepared by reacting lacquer polyisocyanates with hydrophilic, monohydric polyether ester alcohols obtained by reacting monohydric hydrophilic polyether alcohols with ε-caprolactone at an NCO/OH equivalent ratio of 4:1 to 120:1, and their use in the preparation of polyurethane plastics or as a cross-linking agent for water soluble or water dispersible lacquer binders.

14 Claims, No Drawings

WATER DISPERSIBLE POLYISOCYANATE MIXTURES

BACKGROUND OF THE INVENTION

1. Field of the Invention

The present invention relates to water dispersible polyisocyanate mixtures which contain chemically incorporated nonionic, hydrophilic groups, a process for their preparation and their use as a starting component in the preparation of polyurethane plastics, in particular as cross-linking agents for water soluble or water dispersible coating binders having isocyanate-reactive groups.

2. Description of the Prior Art

Due to increasingly stringent environmental legislation, water dispersible polyisocyanates cyanates have in recent years become increasingly important in a number of fields of application.

Water dispersible polyisocyanates play a particular role today as cross-linking components for water reducible, two-component polyurethane (2K-PUR) coating compositions. Combined with aqueous polyol dispersions, they enable solvent-free coating compositions to be formulated which cure at room temperature to give high quality coatings whose resistance to solvents and chemicals are not inferior to solvent-based coating compositions in any respect (cf., for example, EP-A 358,979, EP-A 469,389, EP-A 496,210, EP-A 542,105, EP-A 543,228, EP-A 562,282, EP-A 562,436, EP-A 583,728, DE-OS 4,129,951, DE-OS 4,226,242, DE-OS 4,226,243 and DE-OS 4,226,270).

Water dispersible polyisocyanate preparations are additionally important as additives for aqueous adhesive dispersions. They contribute, for example, towards considerably improved heat and water resistance in adhesives for various materials (cf., for example, EP-A 61,628 and EP-A 206,059).

Water dispersible polyisocyanates are also useful in environmentally sound textile finishing, as cross-linking components for fluorocarbon dispersions (EP-A 560,161), and in formaldehyde-free textile printing inks (EP-A 571,867). The use of hydrophilic polyisocyanates as additives for improving the wet strength of paper has also been disclosed (DE-OS 4,211,480).

A number of prior publications describe the preparation of hydrophilic, water dispersible polyisocyanates. GB-PS 1,417,618 and GB-PS 1,417,276, for example, refer to reaction products of organic, in particular aromatic, polyisocyanates with polyethylene glycol monoalkyl ethers having at least 5 ethylene oxide units or with diesters of malonic acid, and as surface-active substances such polyethers enable stable aqueous emulsions of aromatic polyisocyanates to be prepared in accordance with GB-PS 1,444,933 and DE-OS 2,908,844.

Aromatic polyisocyanates which have been rendered hydrophilic with alkylene oxide polyethers are also known from EP-A 61,628 and EP-A 95,594. In the form of aqueous emulsions these products are of use for adhesive applications in particular.

Derivatives of aromatic polyisocyanates are known to have low resistance to yellowing and are known to be highly reactive with the dispersing medium, i.e., water, thus giving rise to carbon dioxide formation. Therefore, they are only of limited suitability for high-performance lightfast applications and for applications which necessitate long processing times. Products based on the less reactive (cyclo)aliphatic polyisocyanates are utilized for these applications.

Water dispersible (cyclo)aliphatic polyisocyanates are described in EP-A 206,059. They contain as emulsifiers reaction products of polyisocyanates and monohydric or polyhydric polyalkylene oxide alcohols having at least one polyether chain with at least 10 ethylene oxide units. The products are useful as additives for aqueous adhesives. Because the viscosity maximum to be overcome during dispersion is very high, however, it is frequently only possible to incorporate these water dispersible polyisocyanate preparations homogeneously in aqueous media if considerable shear forces are used (for example, high-speed stirrers). They also frequently crystallize, in particular at high emulsifier contents, which are necessary in order to obtain particularly finely divided dispersions.

In practice, therefore, it is predominantly the reaction products of (cyclo)aliphatic lacquer polyisocyanates with short chain polyethylene oxide polyethers having an average of less than 10 ethylene oxide units, as described in EP-A 540,985 and U.S. Pat. No. 5,200,489, which have proved successful in the majority of applications for hydrophilic polyisocyanates. These reaction products are very easy to stir in even by hand to form stable dispersions in water and show no tendency to crystallize even at high ethylene oxide contents. The relatively low molecular weight of the polyethylene oxide polyethers utilized for imparting hydrophilic characteristics is responsible for the lower isocyanate content and lower average isocyanate functionality that these products exhibit when compared to the water dispersible polyisocyanates described in EP-A 206,059, which have the same degree of hydrophilic character, i.e., the same total ethylene oxide content. However, in lacquers and coatings having identically good resistance characteristics, cross-linking components having a high NCO content and as high a functionality as possible are necessary in order to achieve a high cross-linking density.

According to the teaching of DE-OS 4,036,927, mixtures of aliphatic polyisociyanates with specific emulsifiers that are obtained by reacting diisocyanates with polyalkylene ether alcohols in an OH/NCO equivalent ratio of from 0.6:1 to 1.2:1, also constitute suitable additives for aqueous coating compounds and adhesive dispersions. The principal disadvantage of the polyisocyanate preparations is due to the particular nature of the emulsifiers used. Due to the OH/NCO equivalent ratio used to prepare the emulsifiers, they always contain non-functional, inert molecules, and predominantly contain such inert molecular at the preferred OH/NCO equivalent ratio of 0.8:1 to 1.2:1. When utilized in aqueous coating compositions, these non-reactive emulsifier constituents which are not chemically bound in the coating can diffuse very readily out of the coating, causing surface defects and, generally, embrittlement of the coating. Nor are polyisocyanate preparations based on the named emulsifiers really suitable for industrial use as agents for improving the wet strength of paper, because their inert constituents would result in a heavy effluent load.

An object of the present invention is to provide novel water dispersible polyisocyanate mixtures which are suitable for use in all of the previously mentioned fields of application for hydrophilic polyisocyanates, in particular as starting components for the preparation of polyurethane plastics, and more particularly as cross-linking agents for aqueous binders or binder components in aqueous coating compositions and which do not have the previously mentioned disadvantages of the prior art water dispersible polyisocyanates.

This object may be achieved with the polyisocyanate mixtures according to the invention which are described in greater detail hereinafter and by the process for their preparation. These polyisocyanate mixtures are based on the surprising observation that polyisocyanates which are hydrophilically modified with specific, monofunctional polyether ester alcohols exhibit, even at low temperatures and in prolonged storage, no tendency to crystallize. This is true even when they contain high levels of the long-chain polyether chains having an average of more than 10 ethylene oxide units arranged within polyether ester chains, unlike the water dispersible polyisocyanates described in EP-A 206,059 which contain equally high levels of polyethers having the same chain length.

The use of long-chain polyether ester alcohols in the process according to the invention enables polyisocyanates which are rendered highly hydrophilic to be prepared, which may be used to produce finely divided dispersions. When compared to the polyisocyanate mixtures described in EP-A 540,985 and U.S. Pat. No. 5,200,489, which contain simple short-chain polyether alcohols and are also stable to crystallization, the polyisocyanate mixtures according to the invention are distinguished by a higher isocyanate content and an increased functionality at the same total ethylene oxide content.

It was particularly surprising that the novel polyisocyanate mixtures according to the invention which contain reaction products of polyether alcohols and ε-caprolactone may be used to prepare aqueous dispersions which are stable to sedimentation, even at total ethylene oxide contents which are markedly lower than those of prior art water dispersible polyisocyanate mixtures prepared from the corresponding polyether alcohols.

SUMMARY OF THE INVENTION

The present invention relates to water dispersible polyisocyanate mixtures having a) an average NCO functionality of 1.8 to 4.6, b) an isocyanate group content (calculated as NCO, molecular weight 42) of 7.0 to 21.5 wt. % and c) an ethylene oxide content (calculated as $C_2H_4O$, molecular weight 44) of 5 to 25 wt. % arranged within polyether ester chains corresponding to the formula $$Y[-Z-O]_m[-CO-(CH_2)_5-O]_n-$$

wherein

Y represents a radical $R^1-O-$ or a radical $R^2R^3N-$, $R^1$, $R^2$ and $R^3$ are the same or different and represent saturated or unsaturated aliphatic or cycloaliphatic radicals, or optionally alkyl-substituted aromatic or araliphatic radicals, wherein the radicals contain up to 18 carbon atoms and optionally up to 3 heteroatoms selected from oxygen, sulphur, nitrogen, or $R^2$ and $R^3$ may also form together with the nitrogen atom and optionally an oxygen or a further nitrogen atom a heterocyclic ring having 3 to 5 carbon atoms, Z represents an ethylene radical ($-CH_2-CH_2-$) or a propylene radical ($-CH_2-CH(CH_3)-$), wherein the amount of ethylene radicals, based on the total amount of alkylene radicals Z, is at least 70 mole %, m represents an integer or fractional number from 5 to 70 and n represents an integer or fractional number from 0.5 to 5, provided that the quotient m:n is at least 3.5.

The present invention also relates to a process for the preparation of these water dispersible polyisocyanate mixtures by reacting A) a polyisocyanate component having an average NCO functionality of 2.1 to 5.0 and an isocyanate group content (calculated as NCO, molecular weight 42) of 8.0 to 22.5 wt. % with B) a polyether ester monoalcohol of the formula $$Y[-Z-O]_m[-CO-(CH_2)_5-O]_n-H,$$

in which Y, Z, m and n are as defined above, at an NCO/OH equivalent ratio of 4:1 to 120:1 to obtain reaction products satisfying the requirements of a) to c) above.

The present invention further relates to coating compositions wherein the binder contains water soluble or water dispersible binders and the polyisocyanate mixtures according to the invention as cross-linking agents.

The invention also provides the use of the latter polyisocyanate mixtures as a starting component in the preparation of polyurethane plastics.

The invention also provides, finally, the use of the latter polyisocyanate mixtures as a cross-linking component for water soluble or water dispersible lacquer binders or lacquer binder components in the preparation of coatings with the use of aqueous coating compounds based on such binders or binder components.

DETAILED DESCRIPTION OF THE INVENTION

The polyisocyanates suitable for use as component A) are selected from organic polyisocyanates which have aliphatically, cycloaliphatically, araliphatically and/or aromatically bound isocyanate groups, and preferably have an average NCO functionality of 2.1 to 5.0, more preferably 2.3 to 4.2, and preferably have an isocyanate group content of 8.0 to 22.5 wt %, more preferably 14.0 to 22.5 wt. %.

The polyisocyanates or polyisocyanate mixtures of component A) are modification products or derivatives of monomeric aliphatic, cyclo-aliphatic, araliphatic or aromatic diisocyanates which contain uretdione and/or isocyanurate, urethane and/or allophanate, allophanate and isocyanurate, biuret or oxadiazine trione groups such as those described in DE-OS 1,670,666, DE-OS 1,954,093, DE-OS 2,641,380, DE-OS 3,700,209 and DE-OS 3,900,053 or EP-A 316,738, EP-A 336,205, EP-A 339,396, EP-A 496,208, EP-A 524,500 or EP-A 524,501.

Suitable diisocyanates for the preparation of these lacquer polyisocyanates are those having a molecular weight of 140 to 400 and aliphatically, cycloaliphatically, araliphatically and/or aromatically bound isocyanate groups. Examples include 1,4-diisocyanatobutane, 1,6-diisocyanatohexane, 1,5-diisocyanato-2,2-dimethylpentane, 2,2,4- or 2,4,4-trimethyl-1,6-diisocyanatohexane, 1,10-diisocyanatodecane, 1,3-and 1,4-diisocyanatocyclohexane, 1-isocyanato-3,3,5-trimethyl-5-isocyanatomethylcyclohexane (isophorone diisocyanate), 4,4'-diisocyanatodicyclohexylmethane, 1-isocyanato-1-methyl-4(3)isocyanato-methylcyclohexane, 1,3- and 1,4-bis(2-isocyanato-prop-2-yl) benzene, 2,4- and/or 2,6-diisocyanatotoluene (TDI), 2,4'- and/or 4,4'-diisocyanato-diphenylmethane, 1,5-diisocyanatonaphthalene and mixtures of such diisocyanates.

Component A) is preferably selected from polyisocyanates exclusively having aliphatically and/or cycloaliphatically bound isocyanate groups. More preferably component A) is selected from polyisocyanates prepared from 1,6-diisocyanatohexane, isophorone diisocyanate, 4,4'-diisocyanato-dicyclohexylmethane and mixtures of these diisocyanates.

Starting component B) to be utilized in the process according to the invention is selected from monohydric polyether ester alcohols of the formula $$Y[-Z-O]_m[-CO-(CH_2)_5-O]_n-H,$$

wherein the variables are broadly defined as set forth above and preferably:

Y represents a radical $R^1-O-$, wherein $R^1$ represents an aliphatic or cycloaliphatic hydrocarbon radical having 1 to 10 carbon atoms, optionally substituted with oxygen and/or nitrogen, more preferably represents a $C_1-C_4$ alkyl radical, Z represents ethylene or propylene radicals, wherein the amount of ethylene radicals, based on the total quantity of alkylene radicals, is at least 80 mole%, more preferably 100 mole %.

m represents an integer or fractional number from 5 to 60, and n represents an integer or fractional number from 0.5 to 3, provided that the quotient m:n is at least 4.5.

These polyether ester alcohols corresponding to the formula are obtained in known manner by a ring opening reaction between monohydric polyalkylene oxide polyether alcohols and ε-caprolactone.

The preparation of polyalkylene oxide polyether alcohols by alkoxylation of suitable starter molecules is also known. Suitable starter molecules for the preparation of these monohydric polyalkylene oxide polyether alcohols include monohydroxy compounds of the formula $$R^1-O-H$$

or secondary monoamines of the formula $$R^2R^3N-H,$$

wherein $R^1$, $R^2$ and $R^3$ are as defined above.

Examples include saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-ethyl-3-hydroxymethyl-oxetane and tetrahydrofurfuryl alcohol; unsaturated alcohols such as allyl alcohol, 1,1-dimethyl allyl alcohol and oleyl alcohol; aromatic alcohols such as phenol and the isomeric cresols and methoxyphenols; araliphatic alcohols such as benzyl alcohol, anisyl alcohol and cinnamyl alcohol; secondary monoamines such as dimethylamine, diethylamine, dipropylamine, diisopropylamine, dibutylamine, diisobutylamine, bis(2-ethylhexyl)amine, N-methyl- and N-ethylcyclohexylamine and dicyclohexylamine; heterocyclic secondary amines such as morpholine, pyrrolidine, piperidine and 1H-pyrazole; and aminoalcohols such as 2-dimethyl-aminoethanol, 2-diethylaminoethanol, 2-diisopropylamino-ethanol, 2-dibutyl-aminoethanol, 3-(dimethylamino)-1-propanol and 1-(dimethylamino)-2-propanol.

Suitable alkylene oxides are ethylene oxide and propylene oxide, which may be introduced into the alkoxylation reaction in any sequence or as a mixture.

In order to prepare starting component B), either monofunctional polyethylene oxide polyether alcohols or mixed polyalkylene oxide polyether alcohols, wherein the alkylene oxide units are made up of at least 70 mole %, preferably at least 80 mole %, and more 100 mole %, of ethylene oxide units, are reacted with ε-caprolactone caprolactone in a molar ratio of ε-caprolactone to polyether alcohol (whose number average molecular weight can be calculated from the OH number and the functionality of 1) of 0.5:1 to 5:1, preferably 0.5:1 to 3:1 and more preferably 1:1 to 2: 1, while observing the requirements regarding the quotient m:n. The reaction may be conducted at a temperature of 20° to 200° C., preferably from 50° to 160° C., optionally in the presence of catalysts such as Lewis acids or Brönstedt acids, organic tin or titanium compounds.

Preferred starting components B) for the process according to the invention are polyether ester alcohols prepared from polyalkylene oxide polyether alcohols which have been initiated with aliphatic or cyclo-aliphatic alcohols. Polyalkylene oxide polyether alcohols initiated with saturated aliphatic alcohols having 1 to 4 carbon atoms in the alkyl radical are especially preferred.

In the process according to the invention, starting components A) and B) are reacted together at temperatures of 20° to 120° C., preferably 40° to 100° C., and at an NCO/OH equivalent ratio of 4:1 to 120:1, preferably 6:1 to 100:1. The reaction is preferably continued until the theoretically calculated NCO content is reached. The type and amounts of the starting components are selected such that the resulting polyisocyanate mixtures have a) an average NCO functionality of 1.8 to 2.6, preferably 2.0 to 4.0 and more preferably 2.2 to 3.6, b) an NCO content of 7.0 to 21.5 wt. %, preferably 12.0 to 20.5 wt. % and more preferably 14.0 to 20.0 wt. % and c) an content of ethylene oxide units arranged within polyether ester chains of 5 to 25 wt. %, preferably 7 to 20 wt. % and more preferably 8 to 18 wt. %.

The reaction may be carried out, although this is less preferred, in a suitable solvent which is inert to isocyanate groups. Suitable solvents include the known lacquer solvents, such as ethyl acetate, butyl acetate, ethylene glycol monomethyl- or -ethyl ether acetate, 1-methoxypropyl-2-acetate, 2-butanone, 4-methyl-2-pentanone, cyclohexanone, toluene, propylene glycol diacetate, diethylene glycol dimethylether, diethylene glycol ethyl- and -butylether acetate, N-methyl-pyrrolidone, N-methyl-caprolactam, and mixtures thereof.

The products according to the invention are clear, virtually colorless polyisocyanate mixtures which do not have a tendency to crystallize even during prolonged storage and at low temperatures. Even when they contain high amounts of long chain polyether segments arranged within the polyether ester chains containing an average of more than 10 ethylene oxide units, they are resistant to crystallization unlike the water dispersible polyisocyanates described in EP-A 206, 059, which contain similarly high levels of polyether chains.

The utilization of such long-chain polyether esters makes it possible in accordance with the present invention to prepare polyisocyanates which are highly hydrophilic, are particularly finely dispersible and, by comparison with the known crystallization-stable polyisocyanate mixtures described in EP-A 540,985 and U.S. Pat. No. 5,200,489 which contain short-chain polyether alcohols, are distinguished by containing higher levels of isocyanate and having an increased functionality, when both polyisocyanate mixtures have the same ethylene oxide content.

The novel polyether ester-modified polyisocyanate mixtures can be readily dispersed in water without utilizing high shear forces, simply by stirring. They require a lower total content of ethylene oxide units to obtain sedimentation-stable aqueous dispersions at a given composition and molecular weight distribution of the polyether segments present within polyether ester chains, than prior art water dispersible polyisocyanate mixtures which have been prepared from polyether alcohols of the same composition and molecular weight distribution. This fact represents an advantage in particular for the use of the polyisocyanate mixtures according to the invention in aqueous 2K-PUR coating compositions since the resulting coatings have a lower hydrophilic group content and consequently a greater resistance to water.

Polyisocyanates which have not been rendered hydrophilic, in particular the previously disclosed lacquer polyisocyanates, may also be added, before emulsification, to the polyisocyanate mixtures according to the invention, provided that the resulting polyisocyanate mixtures conform to requirements a) to c). These mixtures represent polyisocyanate mixtures according to the invention since the latter generally contain mixtures of (i) polyisocyanates which have been modified so as to render them hydrophilic according to the invention and
(ii) unmodified, hydrophobic polyisocyanates.

In such mixtures the products according to the invention adopt the function of an emulsifier for the non-hydrophilic polyisocyanate portion which is subsequently admixed.

The polyisocyanate mixtures according to the invention represent valuable starting materials for the preparation of polyurethane plastics using the isocyanate polyaddition process. Aqueous emulsions containing the polyisocyanate mixtures in combination with water dispersed polyhydroxyl compounds generally used in aqueous two-component systems are preferably utilized for this purpose.

The polyisocyanate mixtures according to the invention are particularly preferably used as cross-linking agents for water dissolved or water dispersed lacquer binders or lacquer binder components having isocyanate-reactive groups, in particular alcoholic hydroxyl groups, in the preparation of coating compositions. The cross-linking agent, optionally in emulsified form, may be combined with the binders or binder components by simple stirring before processing the coating composition by any method, or it may also be combined using two-component system sprayguns.

Examples of suitable lacquer binders or lacquer binder components which may be used in combination with the polyisocyanate mixtures according to the invention to form two-component coating compositions include water dissolved or water dispersed, hydroxy-functional polyacrylates, in particular those having a number average molecular weight ($M_n$) of 1000 to 10,000, or the known water dispersed, optionally urethane-modified, hydroxy-functional polyester resins. In such coating compositions the polyisocyanate mixtures according to the invention are generally utilized in quantities sufficient to obtain an equivalent ratio of NCO groups to isocyanate-reactive groups, in particular alcoholic hydroxyl groups, of 0.5:1 to 2:1.

In addition to the previously disclosed polyacrylates and polyesters, any water dissolved or water dispersed binders containing isocyanate-reactive groups are suitable co-reactants for the polyisocyanate mixtures according to the invention.

Also suitable are water dispersed polyurethanes or polyureas which are cross-linkable with polyisocyanates through the active hydrogens present in urethane or urea groups, respectively.

The polyisocyanate mixtures according to the invention may optionally also be admixed in minor quantities with non-functional aqueous lacquer binders in order to achieve certain properties, for example, as an adhesion promoter.

The polyisocyanate mixtures according to the invention may also be utilized in a form in which they are blocked with the blocking agents known from polyurethane chemistry. These blocked polyisocyanates may be used in combination with the aforementioned aqueous lacquer binders of lacquer binder components to form one-component PUR stoving compositions.

The coating compositions containing the polyisocyanate mixtures according to the invention may be applied to any substrates, such as metal, wood, glass, stone, ceramics, concrete, rigid and flexible plastics, textiles, leather and paper. These substrates optionally also be provided with conventional primer coats prior to coating.

The coating compositions containing the polyisocyanate mixtures according to the invention, which may also contain the known coating additives, such as flow promoters, colored pigments, fillers or flatting agents, generally possess good coating properties even when dried at room temperature. However, they may also be dried under forced conditions at elevated temperature or by stoving at temperatures of up to 260° C.

Because of their excellent water emulsifiability, which affords a homogeneous, particularly finely divided distribution in aqueous lacquer binders, the use of the polyisocyanate mixtures according to the invention as a cross-linking component for aqueous polyurethane lacquers leads to coatings having excellent optical properties, in particular high surface gloss, flow and high transparency.

In addition to the preferred use as cross-linking components for aqueous 2K-PUR lacquers, the polyisocyanate mixtures according to the invention are eminently suitable as cross-linking agents for aqueous adhesive dispersions, leather and textile coatings or textile printing inks, and also as halogen-free additives for paper-making.

The following examples explain the invention in greater detail. All percentages are by weight, unless otherwise indicated.

EXAMPLES

Preparation of the starting compounds B)

Polyether ester alcohol B1)

1000 g of a monofunctional polyethylene oxide polyether initiated with methanol and having an average molecular weight of 750, and 228 g of ε-caprolactone were mixed at room temperature under dry nitrogen, 0.1 g of phosphoric acid was added, and the batch was then heated to 130° C. for 24 h. After cooling to room temperature, a colorless, waxy product having the following properties was obtained:

| | |
|---|---|
| OH number: | 60 mg KOH/g |
| free ε-caprolactone | 0.1% |
| number average molecular weight (calculated from OH number): | 933 |
| Ethylene oxide content: | 76.9% |

Polyether ester alcohol B2)

1000 g of a monofunctional polyethylene oxide polyether initiated with 3-ethyl-3-hydroxymethyloxetane and having an average molecular weight of 1210, and 94 g of ε-caprolactone were mixed at room temperature under dry nitrogen, 0.1 g of phosphoric acid was added, and the batch was then heated to 130° C. for 24 h. After cooling to room temperature, a colorless, waxy product having the following properties was obtained:

| OH number: | 42 mg KOH/g |
|---|---|
| free ε-caprolactone | 0.3% |
| number average molecular weight (calculated from OH number): | 1333 |
| Ethylene oxide content: | 82.1% |

Polyether ester alcohol B3)

1000 g of a monofunctional polyethylene oxide polyether initiated with methanol and having an average molecular weight of 350, and 326 g of ε-caprolactone were mixed at room temperature under dry nitrogen, 0.1 g of phosphoric acid was added, and the batch was then heated to 130° C. for 24 h. After cooling to room temperature, a colorless liquid having the following characteristic data was obtained:

| OH number: | 120 mg KOH/g |
|---|---|
| free ε-caprolactone | <0.1% |
| number average molecular weight (calculated from OH number): | 467 |
| Ethylene oxide content: | 68.1% |

Example 1

16.1 parts by weight of polyether ester alcohol B1) were added at room temperature under dry nitrogen, with stirring, to 83.9 parts by weight of a polyisocyanate containing isocyanurate groups, based on 1,6-diisocyanatohexane (HDI) and having an NCO content of 21.5%, an average NCO functionality of approx. 3.8 and a viscosity of 3000 mPa.s (23° C.), at an NCO/OH equivalent ratio of 24.9:1, and the batch was then heated to 100° C. for 3 h. After cooling to room temperature, a virtually colorless, clear polyisocyanate mixture having the following properties was obtained:

| NCO content: | 17.3% |
|---|---|
| NCO functionality: | 3.6 |
| Viscosity (23° C.): | 3100 mPas |
| Ethylene oxide content: | 12.4% |

75 g of deionized water were added to 75 g of the polyisocyanate mixture in an Edenmeyer flask, and the batch was convened by gentle stirring into a finely divided, blue-tinged emulsion. The emulsion was stable after standing for 24 h, and showed no signs of precipitation or sediment.

For comparative purposes, according to the teaching of EP-A 206,059 (U.S. Pat. No. 4,663,377), 13.0 parts by weight of the polyethylene oxide polyether used to prepare polyether ester alcohol B1) were added to 87.0 parts by weight of the HDI-based polyisocyanate containing isocyanurate groups described above at an NCO/OH equivalent ratio of 25.7:1, and the batch was then heated to 100° C. for 4 h until an NCO content of 18.0% was obtained. Upon cooling to room temperature the product, which also has an ethylene oxide content of 12.4%, partially crystallized and, thus, was unusable for coating applications.

Example 2

12.2 parts by weight of polyether ester alcohol B2) were added at room temperature under dry nitrogen, with stirring, to 87.8 parts by weight of the HDI-based polyisocyanate containing isocyanurate groups described in Example 1 at an NCO/OH equivalent ratio of 49.1:1, and the batch was then heated to 100° C. for 3 h. After cooling to room temperature, a virtually colorless, clear polyisocyanate mixture having the following properties was obtained:

| NCO content: | 18.5% |
|---|---|
| NCO functionality: | 3.7 |
| Viscosity (23° C.): | 3200 mPas |
| Ethylene oxide content: | 10% |

For comparative purposes, according to the teaching of EP-A 206,059 (U.S. Pat. No. 4,663,377), 11.1 parts by weight of the polyethylene oxide polyether used to prepare polyether ester alcohol B2) were added to 88.9 parts by weight of the HDI-based polyisocyanate containing isocyanurate groups described in Example 1 at an NCO/OH equivalent ratio of 49.6:1, and the batch was then heated to 100° C. for 4 h until an NCO content of 18.7% was obtained. After cooling and allowing to stand at room temperature for 12 hours, the product, which also had an ethylene oxide content of 10.0%, becomes turbid and coarse gel particles formed.

Examples 3 to 6

Using HDI-based polyisocyanate containing isocyanurate groups described in Example 1 and polyether ester alcohol B3) or the polyethylene oxide polyether alcohol used to prepare polyether ester alcohol B3), clear, colorless polyisocyanate mixtures were prepared by the process described in Example 1. Compositions and properties were as follows:

| Example | 3 | 4 (Comp)* | 5 | 6 (Comp)* |
|---|---|---|---|---|
| Polyisocyanate (parts by weight) | 90 | 90 | 89 | 89 |
| Polyether ester B3) (parts by weight) | 10 | — | 11 | — |
| Polyether alcohol (parts by weight) | — | 10 | — | 11 |
| NCO/OH equivalent ratio | 21.5:1 | 16.1:1 | 19.3:1 | 14.5:1 |
| NCO content (%) | 18.5 | 18.2 | 18.2 | 17.8 |
| NCO functionality | 3.6 | 3.6 | 3.6 | 3.5 |
| Viscosity (23° C.) (mPas) | 3050 | 3150 | 3000 | 3150 |
| Ethylene oxide content (%) | 6.8 | 9.1 | 7.5 | 10.0 |

*comparison according to EP-A 540 985 (U.S. Patent 5,252,696)

70 parts by weight of deionized water were added in each case to 30 parts by weight of polyisocyanate mixtures 3 to 6, and the batches were converted into finely divided emulsions by stirring for 5 minutes (magnetic stirrer). After standing for 12 hours, a thick white sediment forms in the emulsions of polyisocyanate mixtures 3 and 4, whereas the emulsions of polyisocyanate mixtures 5 and 6 remain stable.

Both according to the invention and also in the comparison examples a certain minimum quantity of hydrophilicity was necessary to ensure the formation of a stable emulsion (in this case 11 parts by weight of the polyether ester in Example 5 or polyether alcohol in Example 6).

The comparison demonstrate that emulsions which were stable to sedimentation can be prepared from the polyisocyanate mixtures according to the invention (Example 5, which contain reaction products of a polyether ester alcohol and ε-caprolactone) having lower ethylene oxide contents than prior art water dispersible polyisocyanates (Comparison Example 6, which was prepared from the polyether alcohol).

Furthermore, when the polyisocyanate mixture according to the invention from Example 2 is compared with the polyisocyanate mixture from Comparison Example 6, it is apparent that products which are crystallization stable can be prepared according to the invention, which have a higher NCO content and a higher functionality than the crystallization stable, short-chain polyisocyanates containing polyether alcohols described in EP-A 540 985, when both products are compared at the same total ethylene oxide content.

Example 7

12.5 parts by weight of polyether ester alcohol B3) were added at room temperature under dry nitrogen, with stirring, to 87.5 parts by weight of an isocyanurate group-containing polyisocyanate which is present as a 60% solution in butyl acetate, has aromatically and aliphatically bound isocyanate groups, is prepared from TDI and HDI in a molar ratio of 2:1, and has an NCO content of 9.9%, an average NCO functionality of 4.5 and a viscosity of 2400 mPas (23° C.). The components were reacted at an NCO/OH equivalent ratio of 7.7:1, and the batch was then heated to 50° C. for 5 h. After cooling to room temperature, a colorless polyisocyanate mixture having the following properties was obtained:

| NCO content: | 7.5% |
| --- | --- |
| NCO functionality: | 3.9 |
| Solids content | 65% |
| Viscosity (23° C.): | 2450 mPas |
| Ethylene oxide content: | 8.5% |

Example 8 (Use)

100 parts by weight of an aqueous hydroxy-functional polyacrylate dispersion having a solids content of 30% and an OH content of 4.0%, based on solids, and prepared from 8.3% acrylic acid, 18.1% methyl methacrylate, 41.7% n-butyl acrylate and 31.9% hydroxy-$C_3$-alkyl acrylate (addition product of propylene oxide and acrylic acid), were mixed with 0.6 parts by weight of a 25% aqueous solution of a commercial emulsifier (Emulgator W.N., Bayer A.G., Leverkusen), 2.25 parts by weight of a 20% aqueous solution of a commercial, nonionic polyurethane thickening agent (Acrysol RM8, Rohm und Haas, Frankfurt) and 0.7 parts by weight of a commercial defoaming agent (Bevaloid 581 B, Erbslöh, Düsseldorf). The dispersion was stable in storage for an unlimited period.

To this dispersion was added 25.8 parts by weight of the polyisocyanate mixture from Example 1 (equivalent ratio of isocyanate groups to alcoholic hydroxyl groups of 1.5:1), and the batch was then stirred intensively to homogenize it.

The processing time the batch thus mixed was ready-to-use was 3 to 4 hours. The coating which was applied at a wet-film thickness of 200 μm (=approx. 50 μm dry) appeared almost transparent with a slightly yellowish shimmer (Tyndall effect) immediately after application as a wet film. The coating was dust dry after approx. 2 to 3 hours and hard dry after approx. 3 to 4 hours. The resulting glossy, completely clear, transparent coating had the following properties:

| Optical (gloss/transparency) | very good |
| --- | --- |
| Pencil hardness | 2 H |

| Solvent resistance | |
| --- | --- |
| white spirit | very good |
| solvent naphtha 100 | very good |
| methoxypropyl acetate | very good |
| acetone | good |
| ethanol | good |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water dispersible polyisocyanate mixture having
  a) an average NCO functionality of 1.8 to 4.6,
  b) an isocyanate group content (calculated as NCO, molecular weight 42) of 7.0 to 21.5 wt. %, and
  c) an ethylene oxide content (calculated as $C_2H_4O$, molecular weight 44) of 5 to 25 wt. % arranged within polyether ester chains corresponding to the formula

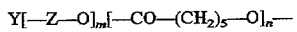

$$Y[-Z-O]_m[-CO-(CH_2)_5-O]_n-$$

wherein

Y represents a radical $R^1$—O— or a radical $R^2R^3N$—, $R^1$, $R^2$ and $R^3$ are the same or different and represent saturated or unsaturated aliphatic or cycloaliphatic radicals, or optionally alkyl-substituted aromatic or araliphatic radicals, wherein the radicals contain up to 18 carbon atoms and optionally up to 3 heteroatoms selected from oxygen, sulphur, nitrogen, or $R^2$ and $R^3$ may also form together with the nitrogen atom and optionally an oxygen or a further nitrogen atom a heterocyclic ring having 3 to 5 carbon atoms, Z represents an ethylene radical (—$CH_2$—$CH_2$—) or a propylene radical (—$CH_2$—$CH(CH_3)$—), wherein the amount of ethylene radicals, based on the total amount of alkylene radicals Z, is at least 70 mole %, m represents an integer or fractional number from 5 to 70 and n represents an integer or fractional number from 0.5 to 5, provided that the quotient m:n is at least 3.5.

2. The water dispersible polyisocyanate mixture of claim 1 wherein

Y represents a radical $R^1$—O—, $R^1$ represents an aliphatic or cycloaliphatic hydrocarbon radical having 1 to 10 carbon atoms, optionally substituted with oxygen and/or nitrogen, Z represents ethylene or propylene radicals, wherein the amount of ethylene radicals, based on the total quantity of alkylene radicals, is at least 80 mole %, m represents an integer or fractional number from 5 to 60, and n represents an integer or fractional number from 0.5 to 3, provided that the quotient m:n is at least 4.5.

3. The water dispersible polyisocyanate mixture of claim 1 which has
  a) an average NCO functionality of 2.0 to 4.0,
  b) an isocyanate group content of 12.0 to 20.5 wt. %, and
  c) an ethylene oxide content of 7 to 20 wt. %.

4. The water dispersible polyisocyanate mixture of claim 2 which has a) an average NCO functionality of 2.0 to 4.0, b) an isocyanate group content of 12.0 to 20.5 wt. %, and c) an ethylene oxide content of 7 to 20 wt. %.

5. The water dispersible polyisocyanate mixture of claim 1 wherein the polyisocyanates exclusively have aliphatically and/or cycloaliphatically bound isocyanate groups.

6. The water dispersible polyisocyanate mixture of claim 2 wherein the polyisocyanates exclusively have aliphatically and/or cycloaliphatically bound isocyanate groups.

7. The water dispersible polyisocyanate mixture of claim 3 wherein the polyisocyanates exclusively have aliphatically and/or cycloaliphatically bound isocyanate groups.

8. The water dispersible polyisocyanate mixture of claim 4 wherein the polyisocyanates exclusively have aliphatically and/or cycloaliphatically bound isocyanate groups.

9. A process for the preparation of a water dispersible polyisocyanate mixture having a) an average NCO functionality of 1.8 to 4.6, b) an isocyanate group content (calculated as NCO, molecular weight 42) of 7.0 to 21.5 wt. %, and c) an ethylene oxide content (calculated as $C_2H_4O$, molecular weight 44) of 5 to 25 wt. % arranged within polyether ester chains corresponding to the formula $Y[-Z-O]_m[-CO-(CH_2)_5-O]_n-$ wherein Y represents a radical $R^1-O-$ or a radical $R^2R^3N-$, $R^1$, $R^2$ and $R^3$ are the same or different and represent saturated or unsaturated aliphatic or cycloaliphatic radicals, or optionally alkyl-substituted aromatic or araliphatic radicals, wherein the radicals contain up to 18 carbon atoms and optionally up to 3 heteroatoms selected from oxygen, sulphur, nitrogen, or $R^2$ and $R^3$ may also form together with the nitrogen atom and optionally an oxygen or a further nitrogen atom a heterocyclic ring having 3 to 5 carbon atoms, Z represents an ethylene radical ($-CH_2-CH_2-$) or a propylene radical ($-CH_2-CH(CH_3)-$), wherein the amount of ethylene radicals, based on the total amount of alkylene radicals Z, is at least 70 mole %, m represents an integer or fractional number from 5 to 70 and n represents an integer or fractional number from 0.5 to 5, provided that the quotient m:n is at least 3.5, which comprises reacting A) a polyisocyanate component having an average NCO functionality of 2.1 to 5.0 and an isocyanate group content of 8.0 to 22.5 wt. % with B) a polyether ester monoalcohol of the formula $Y[-Z-O]_m[-CO-(CH_2)_5-O]_n-H$, at an NCO/OH equivalent ratio of 4:1 to 120:1.

10. The process of claim 9 wherein said polyisocyanate component A) has an average NCO functionality of 2.3 to 4.2 and an isocyanate group content of 14.0 to 22.5 wt. % and the reaction is conducted at an NCO/OH equivalent ratio of 6:1 to 100:1.

11. The process of claim 9 wherein said polyisocyanate isocyanate component A) exclusively contains aliphatically and/or cycloaliphatically bound isocyanate groups.

12. The process of claim 10 wherein said polyisocyanate isocyanate component A) exclusively contains aliphatically and/or cycloaliphatically bound isocyanate groups.

13. A polyurethane plastic prepared from the polyisocyanate mixture of claim 1 and a compound having isocyanate-reactive groups.

14. A two-component aqueous coating composition containing as binder a water soluble or water dispersible compound containing isocyanate-reactive groups and, as crosslinking agent, the polyisocyanate mixture of claim 1.

* * * * *